(12) United States Patent
Goettler (10) Patent No.: US 6,218,324 B1
(45) Date of Patent: Apr. 17, 2001

(54) CERAMIC COMPOSITES CONTAINING WEAK INTERFACES WITH $ABO_4$ TUNGSTATE, MOLYBDATE, TANTALATE, AND NIOBATE PHASES

(75) Inventor: Richard W. Goettler, Lynchburg, VA (US)

(73) Assignee: McDermott Technology, Inc., New Orleans, LA (US)

( * ) Notice: Subject to any disclaimer, the term of this patent is extended or adjusted under 35 U.S.C. 154(b) by 0 days.

(21) Appl. No.: 09/007,280

(22) Filed: Jan. 14, 1998

(51) Int. Cl.$^7$ .................. C04B 35/10; C04B 35/495; C04B 35/56

(52) U.S. Cl. .................. 501/88; 501/120; 501/127; 501/128

(58) Field of Search .................. 501/152, 88, 120, 501/127, 128

(56) References Cited

U.S. PATENT DOCUMENTS

| | | | |
|---|---|---|---|
| H1682 | 10/1997 | Brown et al. | 205/509 |
| 4,770,673 | * 9/1988 | Ketcham et al. | 51/309 |
| 4,939,107 | * 7/1990 | Ketcham | 501/102 |
| 5,008,221 | * 4/1991 | Ketcham | 501/103 |
| 5,047,373 | * 9/1991 | Ketcham | 501/103 |
| 5,164,229 | 11/1992 | Hay | 427/226 |
| 5,217,533 | 6/1993 | Hay et al. | 118/63 |

OTHER PUBLICATIONS

"The Role of Interfacial Films in the Friction & Wear Properties of W–Co–C Sputtered Coatings," Ramalho et al. Thin Solid Films 254(1–2), 131–8, (1995).*

"$BaSno_3$ & $BaWO_y$ Composite Electroceramics" Lu Weng-zhang et al. Wuji Cailiao Xuctao, 9 (3), 331–5 Chisse, (1994).*

"Thermal Conductivity Considerates for Aluminum Nitride Interfaces" Westwood et al. Ceram Trans. 15 (Mates Proc. Microelectron Syst), 685–710, (1990).*

"Microstructure & Microchemistry of Tungsten & Tungsten Cpd Reactions with Alumim. Nitride Substractes" Westwood et al. Mat. Res. Soc. Symp. Proc. Adv Eletron Packg. Mat'e 295–300, (1990).*

(List continued on next page.)

Primary Examiner—Paul Marcantoni
(74) Attorney, Agent, or Firm—R. J. Edwards; R. C. Baraona; Eric Marich (57) ABSTRACT

Ceramic composites containing weak interfacial boundaries included for the purposes of providing avenues for crack deflection with a resulting toughening of a ceramic body. Weak interfacial boundaries are created between constituents of the composite, such as matrix phases and any continuous and/or particulate reinforcements, and tungstate, molybdate, tantalate, and niobate compounds of the general formula $ABO_4$. For tungstate and molybdate compounds of the general formula $ABO_4$, B represents tungsten or molybdenum, and A represents a divalent cation. For tantalate and niobate compounds of the general formula $ABO_4$, B represents tantalum or niobium, and A represents a trivalent lanthanide series cation. The $ABO_4$ tungstate, molybdate, tantalate, and niobate compounds may exist as barrier phases between the matrix and the reinforcements of the composite, or the ceramic body may contain discrete particulates, laminae, fibers, or whiskers of the $ABO_4$ tungstate, molybdate, tantalate, and niobate compounds. In a preferred embodiment, the reinforcing phases of the composite is a continuous single or polycrystalline fiber; however, particulate or whisker reinforcements will also benefit by being separated from the matrix phases by an interphase of an $ABO_4$ tungstate, molybdate, tantalate, or niobate. A non-brittle material may also be fabricated by creating multilayer laminar composites containing alternating lamina of the $ABO_4$ compound and a second phase.

4 Claims, 10 Drawing Sheets

OTHER PUBLICATIONS

Composition of the Mo–Ru–Rh–Pa & $UO_2$–$ZrO_2$–$MoO_2$–$BaO_2$ Systems & their Correlation with the Preciptates of Fission Products in Irradiated Fuels. Paschoal et al. Konforschzzert Karlsruhle KFK –3473, (1983).*

"Further Development of Borosilicate Fars For the of Hifilend Fissim Provent Solutions." Dippel et al. ASW Atomwrtsch Atomtech, 25(2), 81–2, (1980).*

"Process for Improving the Abrasion Risstance of Alumina Ceramics" Sztankovics et al. Hung Teljes Hu 55721, (1991).*

The Region of Phase with Layered Perovskite –Like Structure in the La–Ti–Nb–Ga System ($La_2+_2o_7$–$LaNbo_4$–$LaGao_3$) Sych et al. Ukr.KhimZh 55(6) 563–6, (1989).*

* cited by examiner

CERAMIC COMPOSITES CONTAINING WEAK INTERFACES WITH $ABO_4$ TUNGSTATE, MOLYBDATE, TANTALATE, AND NIOBATE PHASES

FIELD OF THE INVENTION

The present invention relates generally to the field of continuous fiber ceramic composites (CFCC) and, in particular, to new and useful ceramic composites with tungstate, molybdate, tantalate, and niobate interphases in the form $ABO_4$ providing weak interfaces with reinforcement and/or matrix phases so that the ceramic composites exhibit improved toughness and resistance to high temperature oxidizing environments. For tungstate and molybdate compounds of the general formula $ABO_4$, B represents tungsten or molybdenum, and A represents a divalent cation. For tantalate and niobate compounds of the general formula $ABO_4$, B represents tantalum or niobium, and A represents a trivalent lanthanide series cation.

BACKGROUND OF THE INVENTION

A known method for increasing the toughness of a ceramic body is to incorporate weak interphases or interfaces into the material. As an example, it is common to reinforce a ceramic matrix with continuous fibers which are coated with a thin layer of either boron nitride or carbon. The carbon or boron nitride creates a weak interface between the matrix and the fiber which allows sliding between the fiber and the matrix and/or causes propagating cracks to be deflected along the interface or within the interphase. These events allow the reinforcing fibers to remain intact and continue to reinforce the ceramic body and to arrest additional crack propagation. Similar interfacial failures can occur in particulate and whisker reinforced materials which contain weak interfaces. In these instances microcracking and crack deflection characteristics result in toughening of the ceramic body. In multilayered laminar composites, multiple parallel interfaces may fracture, thus increasing the work of fracture of the entire ceramic body.

Typical approaches to creating a weak interface between reinforcing phases and matrix phases incorporate interphase compounds which are characterized by layered crystal structures containing a crystal plane exhibiting weak shear properties. This characteristic promotes interfacial debonding and fiber pullout toughening (i.e., fiber frictional sliding) mechanisms. Materials commonly used include carbon, boron nitride, micaceous materials such as fluorphlogophite such as disclosed by U.S. Pat. No. 4,935,387 to Beall et al., and beta-alumina/magnetoplumbite compounds such as disclosed by U.S. Pat. No. 5,137,852 to Morgan et al.

Since many ceramic composites are used in high-temperature oxidizing environments (typically at temperatures exceeding 1100° C.), the reinforcement/matrix interphase must be oxidation resistant and stable thermodynamically with both the reinforcement and the matrix phase. Carbon and boron nitride materials oxidize readily and are unsuitable for use in composites requiring long-term service at temperatures greater than 600° C. In addition, boron nitride is rapidly degraded by water vapor making its use as an interphase material in combustion atmospheres, and other water vapor laden environments, very limited. Fluorphlogophite and beta-alumina/magnetoplumbite compounds have a tendency to react with many of the continuous fiber reinforcements currently commercially available.

Some non-layered oxide compounds have been studied as interphase in continuous fiber ceramic composites. These include tin oxide, zirconium oxide, and zirconium tin titanate. These compounds were considered for alumina reinforced composites because of the lack of reactivity between these interphase compounds and alumina. It was determined that these compounds work well as reaction barriers between matrix and reinforcement, but they do not provide the weak interphase or interface needed to cause crack deflection and fiber pullout toughening.

Monazite and xenotime compounds, phosphates with the general formula $APO_4$, in which A represents trivalent rare earth elements of the lanthanide series, are non-layered crystal compounds which are disclosed for creating weak interfaces in ceramic composites by U.S. Pat. No. 5,514,474 to Morgan et al. These materials appear to provide a weak interface, rather than a weak interphase, by exhibiting high interfacial energies (low bonding) with possible reinforcements and matrices. Although some promising preliminary results have been demonstrated with monazite and xenotime in model composite systems, incorporation of these interfaces into actual continuous fiber reinforced ceramic composites has yielded mixed results.

SUMMARY OF THE INVENTION

There is a need for additional non-layered ceramic materials which create weak interfaces with typical composite reinforcing and matrix phases. It is desirable to have available other non-layered ceramics which can create even weaker interfaces than achievable with monazite and xenotime type of compounds. Since a greater number of candidate interphase materials are available to choose from to create weak interfaces within ceramic composites, the possible selection of reinforcing and matrix compositions which can be chosen from which to engineer high toughness composite systems is increased. Ceramic composites are often used in corrosive environments. Increasing the variety of ceramic composite systems which are available to operate in high temperature oxidizing environments, for example, gives the end users of these materials a greater chance of finding a composite system to withstand their specific corrosive environment.

It is thus an object of the present invention to provide an increased range of ceramic composite systems having improved toughness and resistance to stressful or corrosive environments.

It is a further object of the invention to provide new groups of fiber coatings for continuous fiber ceramic composites having weak interfaces or interphases for improving the durability characteristics of the composite.

Accordingly, one aspect of the present invention is drawn to a ceramic composite comprising a ceramic matrix and a material having the general formula $ABO_4$, where A is a divalent cation and B is one of tungsten and molybdenum, dispersed within the ceramic matrix, to create a weak interface between the ceramic matrix and the material. This ceramic composite, if desired, may further comprise a reinforcement phase surrounded by the $ABO_4$ material imbedded in the ceramic matrix, and which can comprise one of continuous fibers, discrete particulates, laminae, and whiskers.

Another aspect of the present invention is drawn to a ceramic composite comprising: a ceramic matrix and a material having the general formula $ABO_4$, where A is a trivalent lanthanide series cation and B is one of tantalum and niobium, dispersed within the ceramic matrix, to create a weak interface between the ceramic matrix and the material. Again, this ceramic composite, if desired, may further comprise a reinforcement phase surrounded by the $ABO_4$ material imbedded in the ceramic matrix, and which can comprise one of continuous fibers, discrete particulates, laminae, and whiskers.

Accordingly, ceramic composites are provided containing phases of tungstates and molybdates. The tungstate and molybdate compounds have the general formula $ABO_4$, where A is a divalent cation and B is tungsten or molybdenum. The specific tungstates and molybdates are compounds from the Scheelite ($CaWO_4$), Powellite ($CaMoO_4$), Ferberite ($FeWO_4$), Hueberite ($MnWO_4$), Wulfenite ($PbMoO_4$), Stolzite ($PbWO_4$), and Sanmartinite ($ZnWO_4$) mineral groups. Tungstate and molybdate compounds composed of the alkaline earth elements consisting of Mg, Ca, Sr, and Ba are all considered to be within the scope of this invention, as are also the molybdate analogs to Ferberite, Hueberite, and SanmartiNite. These composites are stable in oxidizing environments to temperatures which vary according to the melting temperature of the specific tungstate or molybdate. In general, the $ABO_4$ tungstates will yield ceramic composites with higher use temperatures than are achieved with composites containing $ABO_4$ molybdates. Composites containing $CaWO_4$ interphases yield the highest temperature composite capability because of the higher melting temperature of scheelite in comparison to the other tungstates and molybdates.

Ceramic composites are also provided containing phases of tantalates and niobates. The tantalate and niobate compounds have the general formula $ABO_4$ where A is a trivalent lanthanide series cation and B is tantalum or niobium. Composites containing these interphase compounds are stable in oxidizing environments to temperatures which vary according to the melting temperature of the specific tantalate or niobate. The tantalates have higher melting temperatures than the tungstates by 300° C. to 400° C. The niobates do not have much higher melting temperatures than the tungstates. The upper use temperature for composites containing tantalate or niobate interphases may likely not be limited by the melting point of the tantalate or niobate. Instead, the tantalates (at approximately 1300° C. to 1400° C.) and the niobates (at approximately 800° C.) undergo a monoclinic (low temperature phase) to tetragonal (high temperature phase) phase transformation at high temperatures. It should be noted that the tantalates are reported to exhibit two monoclinic forms. A P2/a form exists if the tantalate is crystallized from its chemical precursors at temperatures less than the monoclinic-to-tetragonal transformation temperature. This P2/a monoclinic phase will transform to the tetragonal phase above the transformation temperature, but will then exist as the I2 monoclinic phase when cooled below the transformation temperature. It is uncertain at this time whether the niobates exhibit a similar P2/a monoclinic phase.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The ceramic composites according to the invention generally comprise a ceramic matrix and material having the general formula $ABO_4$. For tungstate and molybdate compounds of the general formula $ABO_4$, B represents tungsten or molybdenum, and A represents a divalent cation. For tantalate and niobate compounds of the general formula $ABO_4$, B represents tantalum or niobium, and A represents a trivalent lanthanide series cation. The $ABO_4$ compounds can be present in the ceramic matrix as continuous fibers, discrete particulates, whiskers, or laminae.

An example of a ceramic compound formed according to the invention is described below.

EXAMPLE 1

A ceramic composite model having a scheelite ($CaWO_4$) interphase, alumina reinforcement phase and alumina matrix was fabricated by consolidating an alumina pellet containing lamina of scheelite. Vacuum cast laminae formed from scheelite powder (Alfa Aesar catalog no. 13051) were cold pressed into a matrix of alumina powder (Sumitomo AKP-53) at between 6,000 and 10,000 psi. The pellets were air sintered at 1450° C. for two (2) hours.

Figure 1:
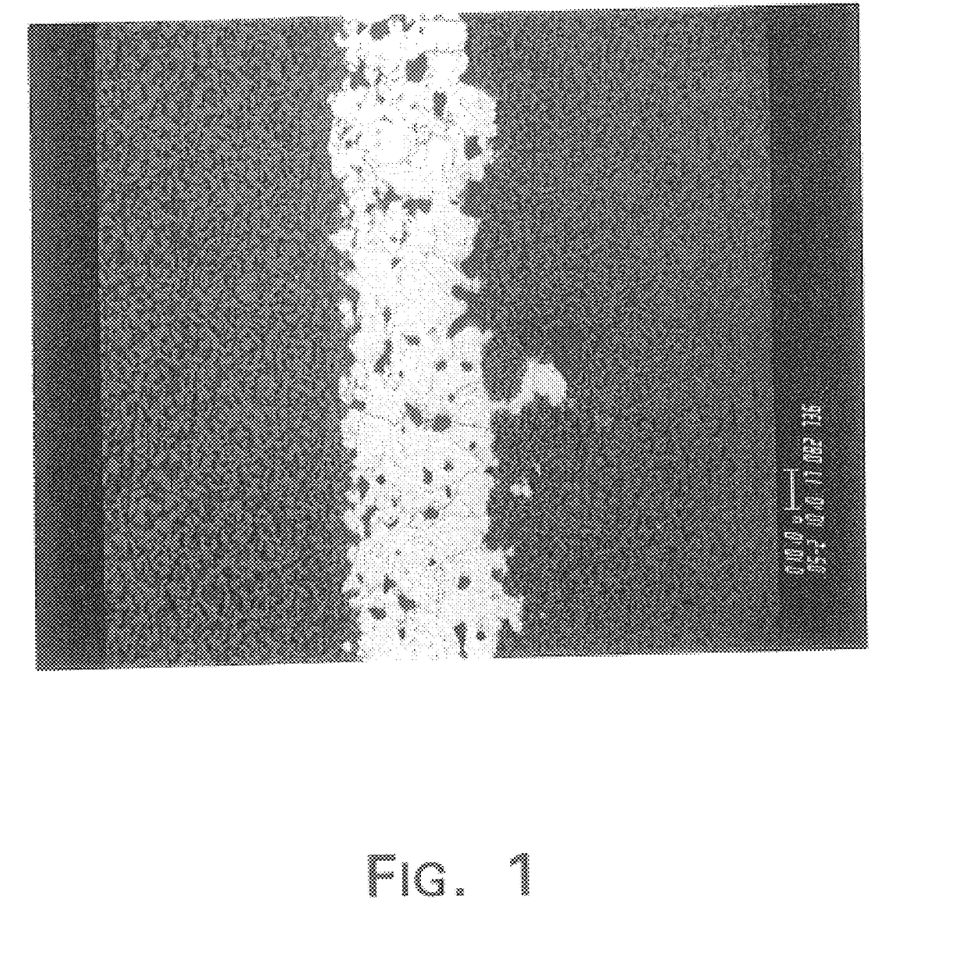
FIG. 1 is a scanning electron microscope (SEM) photograph of the interface between alumina fibers and scheelite ($CaWO_4$) coating.
Figure 2:
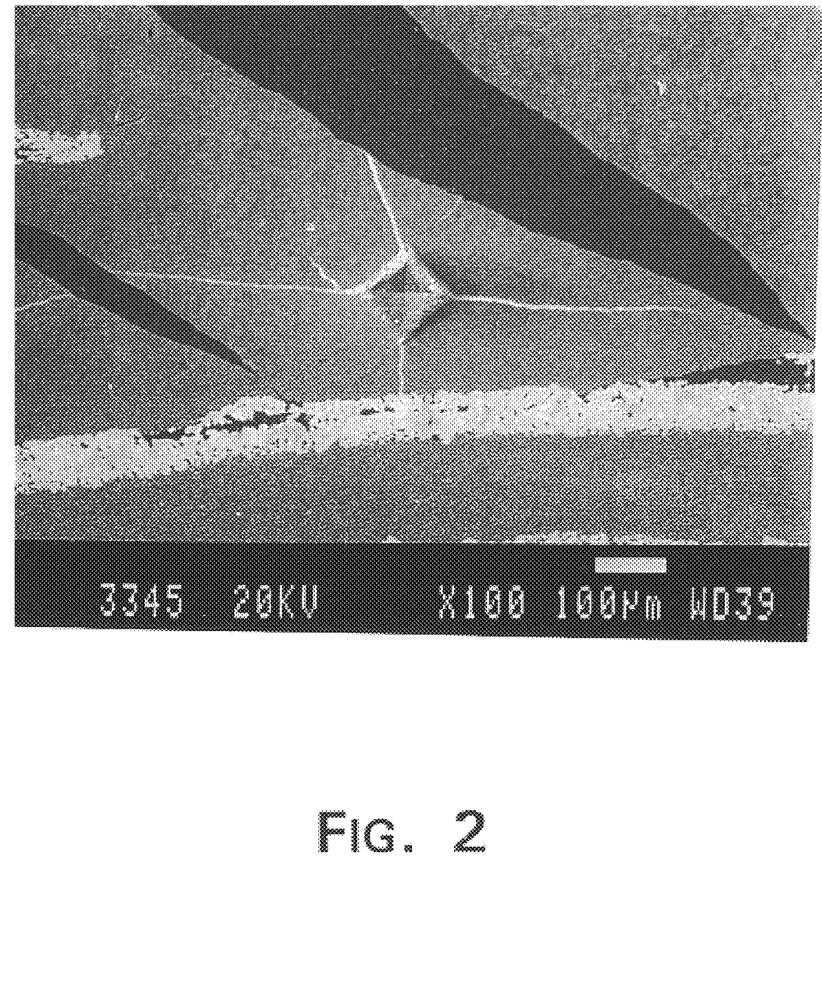
FIG. 2 is an SEM photograph of the interface of FIG. 1 after being subjected to Vickers indentations.
Figure 3:
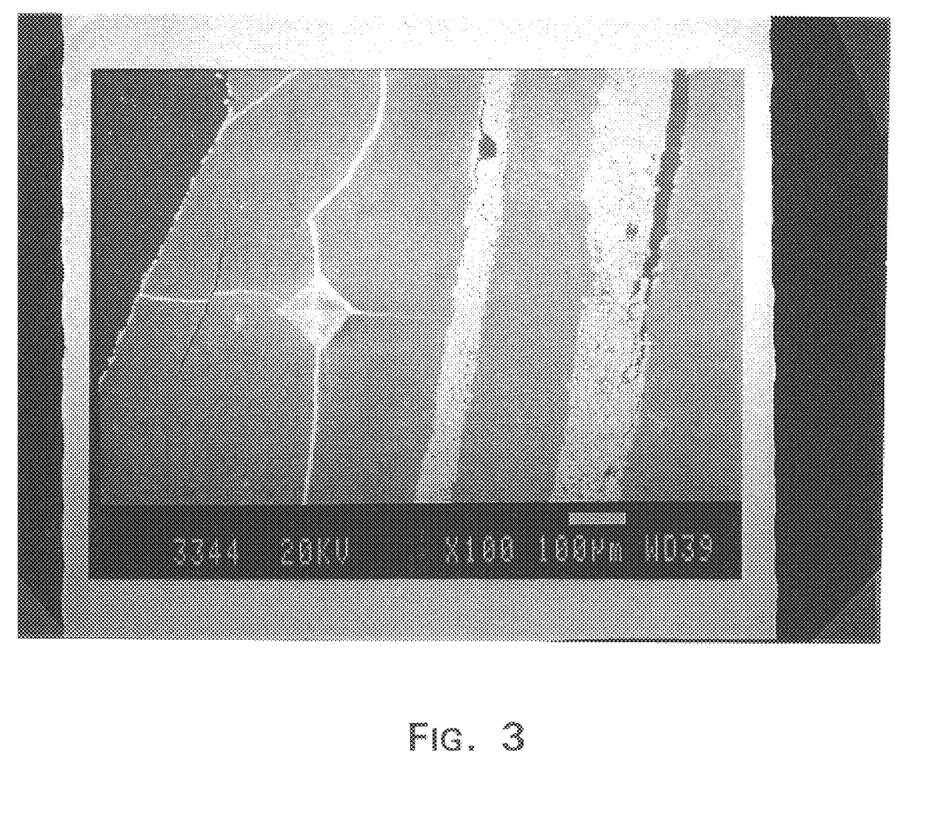
FIG. 3 is another SEM photograph of the interface of FIG. 1 after being subjected to Vickers indentations.

The ceramic composite pellets formed as above were then sliced perpendicular to the alumina-scheelite interfaces. Scanning electron microscope (SEM) photographs were taken across the interface to investigate whether there was any gross reactivity between the alumina and the scheelite, and the results are shown in FIG. 1. FIG. 1 shows the clean, nonreactive interface between the alumina and scheelite. To test the ability of the interfaces to arrest/deflect propagating cracks, Vickers indentations were made using a 10 kg load in the vicinity of the alumina-scheelite interface. FIGS. 2 and 3 show the ability of the interface to arrest or deflect propagating cracks; i.e., the interface limited crack deflection.

The following example describes a continuous fiber reinforced ceramic composite with a scheelite interphase.

EXAMPLE 2

A continuous alumina fiber (3M Nextel 610) was coated with a scheelite coating using sol-gel immiscible liquid techniques, as are known in the art. Pentadecane was substituted as the nonpolar solvent layer for hexane. A water-based precursor to scheelite was formulated by adding calcium nitrate (Aldrich catalog No. 23,712-4) to an aqueous solution of ethylenediaminetetraacetic acid (EDTA) (Aldrich catalog No. 25,404-5). Approximately 51 g of EDTA in 12 liters of demineralized water, in a ratio of one mole EDTA to one mole calcium nitrate, was used.

Separately, tungstic acid (Aldrich catalog No. 22,332-8) was dissolved in an aqueous solution of ammonium hydroxide to make approximately 700ml total solution. Ammonium hydroxide was added to a hot aqueous solution of the tungstic acid until complete dissolution was achieved.

The tungstic acid solution was added to the calcium nitrate/EDTA solution and the combined solution was concentrated to a 3 to 5 weight percent yield of scheelite.

The Nextel 610 fiber was passed through the immiscible liquid coater six times at a rate of 40 in./min. to build up the fiber coating thickness. The fiber was then layed up, unidirectionally, into a 3" by 9" die. Alumina powder (Sumitomo AKP-53) was pressure cast at 100 psi within the fiber preform.

The composite was further densified by performing multiple infiltrations with a concentrated scheelite precursor (~10 wt. % scheelite) to yield a composite with a duplex matrix of alumina and scheelite. The composite was then segmented into two halves; one half was fired in air at 850° C. and the other half was fired in air at 1100° C.

A 0/90 laminate (half the fibers oriented in one direction; the other half of the fibers oriented substantially perpendicular to the first half) composite of Nextel 610 alumina fibers, without discrete fiber coatings and without coatings applied was also fashioned, and was also segmented in halves and fired in the same manner as the composite of Example 2. The four composite segments were then tested at room temperature for their tensile properties. The following table summarizes the results of the tests (two tests per lot).

TABLE 1

| Fiber Architecture | Firing Temperature | Residual Porosity | Strength (ksi) |
| --- | --- | --- | --- |
| unidirectional | 850° C. | 20.5% | 50.5, 36.8 |
| unidirectional | 1100° C. | 18.4% | 51.5, 44.1 |
| 0/90 | 850° C. | 14.5% | 43.4, 44.8 |
| 0/90 | 1100° C. | 15.6% | 31.2, 29.4 |

Figure 4:
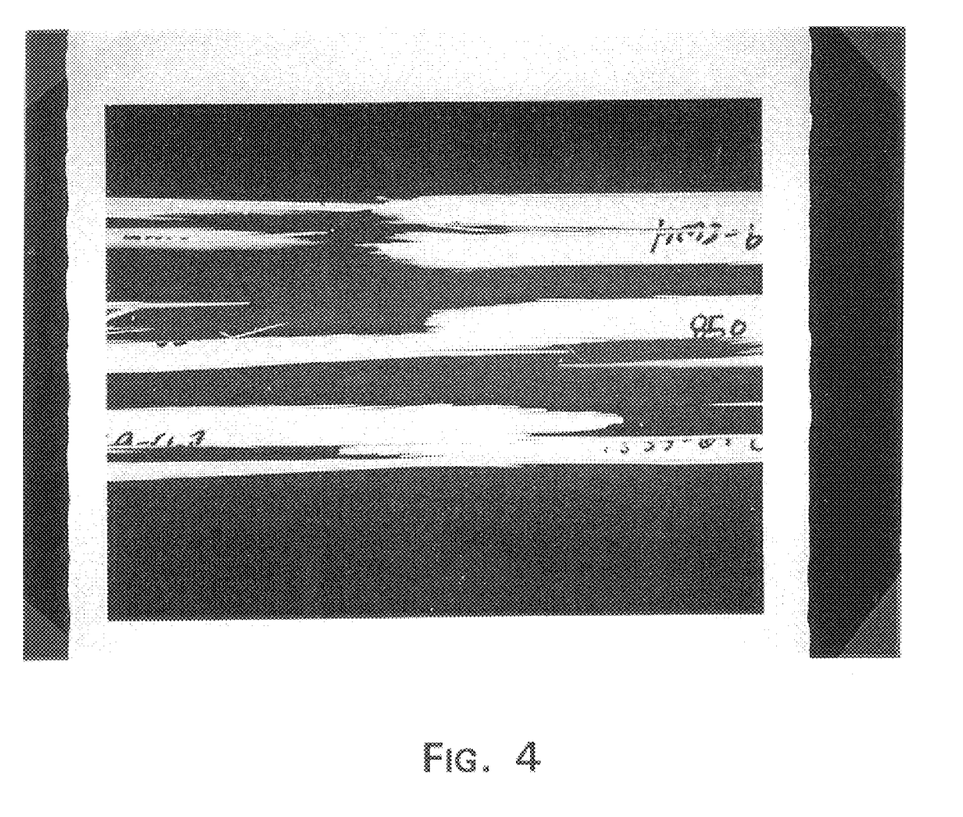
FIG. 4 is an SEM photograph showing fibrous fracture behavior of ceramic composite specimens made according to the invention.
Figure 5:
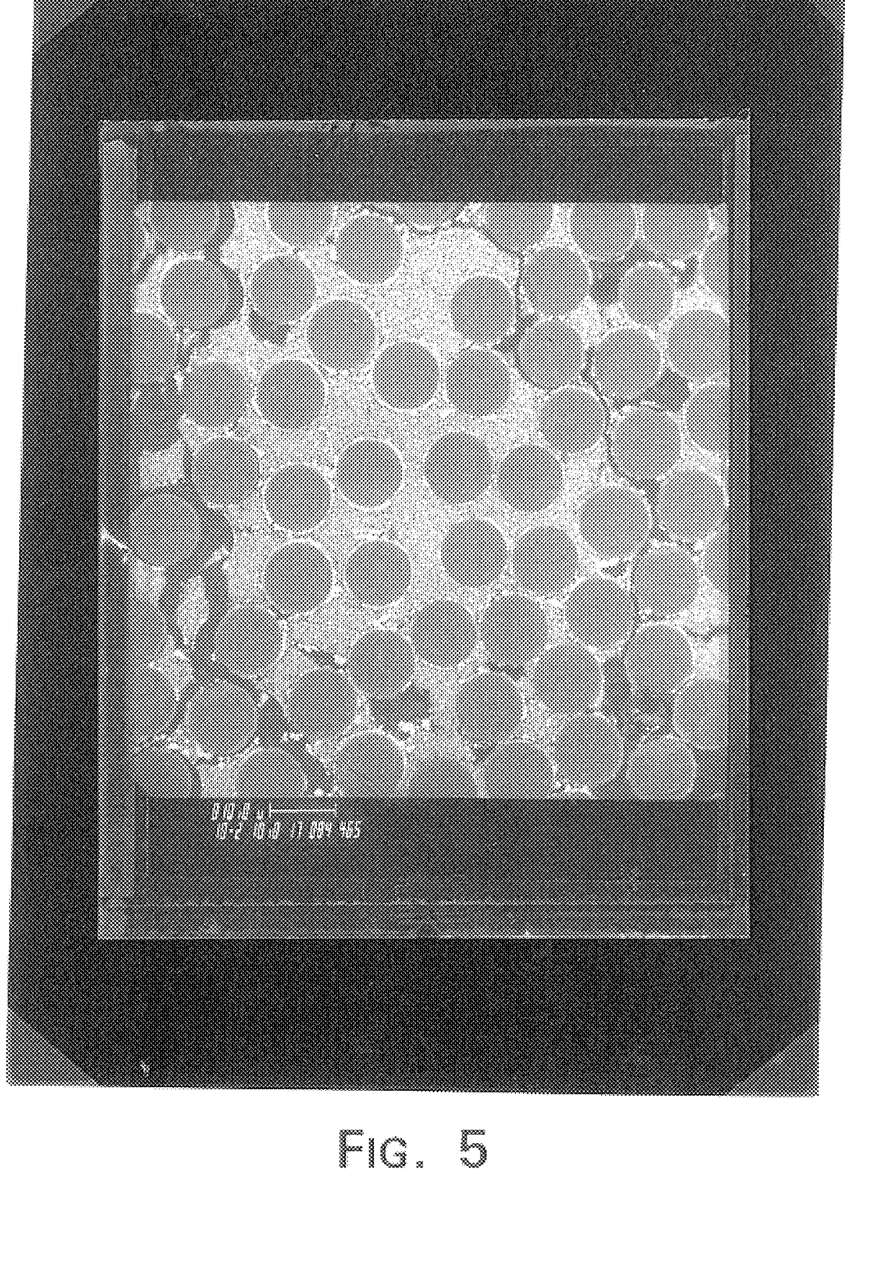
FIG. 5 is an SEM photograph showing the polished cross-section of a unidirectional ceramic composite made according to the invention.
Figure 6:
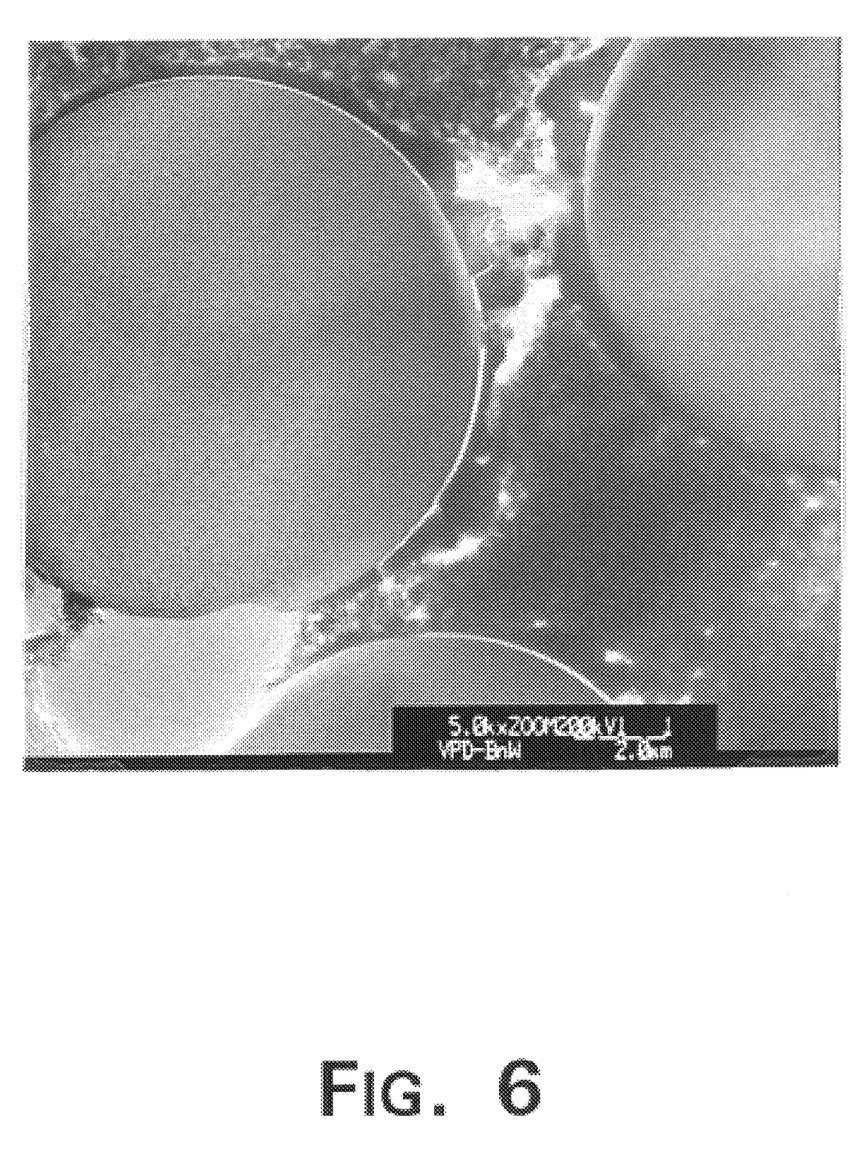
FIG. 6 is a transmission electron microscope (TEM) photomicrograph showing debonding along Nextel 610-scheelite interfaces.
Figure 7:
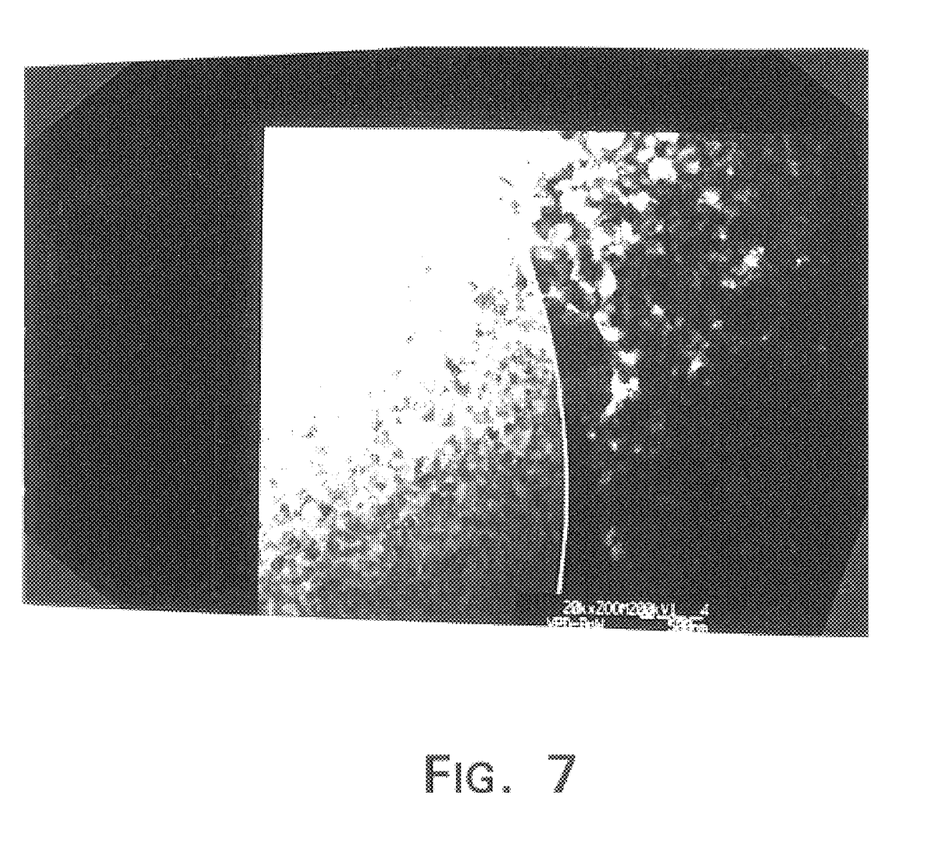
FIG. 7 is a higher magnification TEM photomicrograph showing debonding along Nextel 610-scheelite interfaces.
Figure 8:
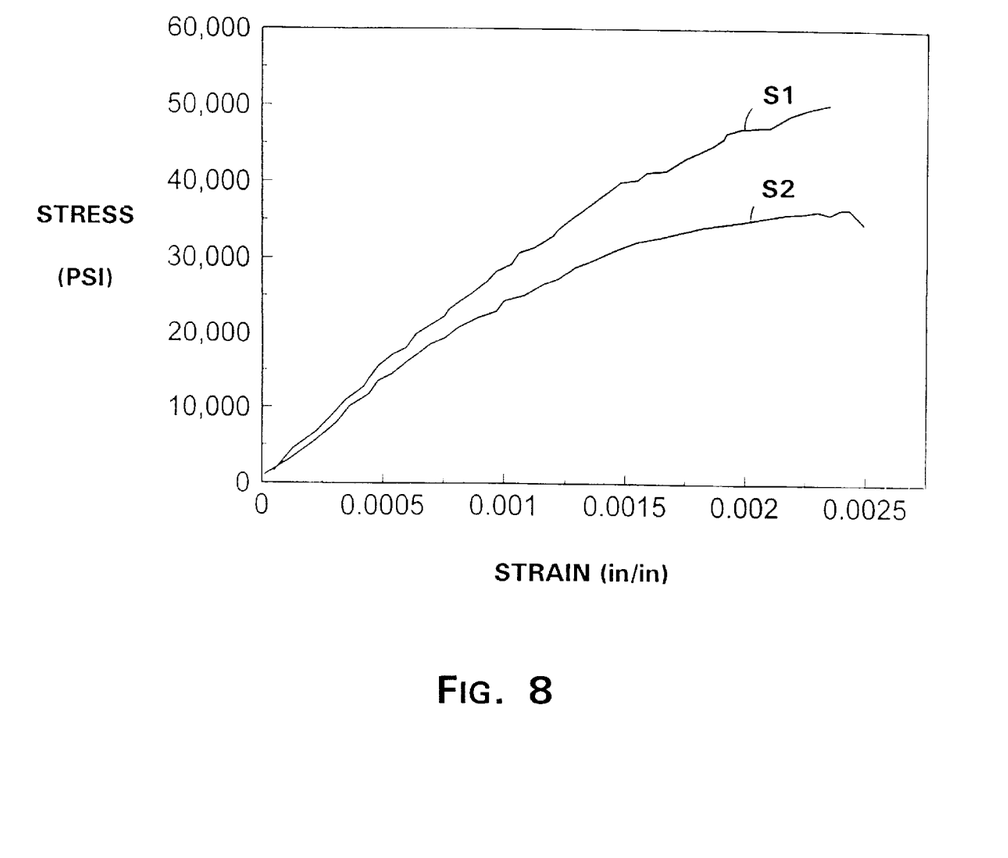
FIG. 8 is a graph showing stress versus strain for two samples of a Nextel 610 unidirectional ceramic composite with scheelite interphase coating in an alumina-scheelite duplex matrix made according to the invention (specimens heated to 85°° C.)

FIG. 4 shows the fibrous fracture behavior observed in these segmented composite specimens. The fibrous type of fracture is indicative of fiber/matrix interfacial debonding and fiber pullout. The ease of fiber debonding is evidenced by the scanning electron microscopy (SEM) photomicrograph of FIG. 5 which shows the polished cross section of a unidirectional specimen which was cut with a thin diamond blade. FIGS. 6 and 7 are transmission electron microscopy (TEM) photomicrographs of the interface region of a composite containing polycrystalline alumina Nextel 610 fibers with scheelite fiber coatings in a duplex matrix of alumina and scheelite (the material of Example 2). The frequent occurrence of the scheelite coating separating from the alumina fiber can be seen in these SEM and TEM photomicrographs. This is proof of weak bonding between the scheelite interphase and the alumina fibers. FIG. 8 shows the stress-strain behavior of the two unidirectional composite segments, S1 and S2, indicated by curves S1 and S2. As seen, a good strain-to-failure value of about 0.25% is obtained.

The stability of scheelite with mullite was investigated by coating alumina-mullite polycrystalline fibers (3M Nextel 720 fiber) with the Ca-EDTA/tungstic acid scheelite precursor solution by multiple dippings of individual fibers into the precursor. Coated and uncoated fibers were heat treated at 1100° C. for one hour and then tensile tests were performed on the individual fibers. No strength differences, based on Weibull plots of 20 fiber tests per lot, between the uncoated and coated heat treated fibers, were observed. Thus, scheelite is stable when used with mullite.

EXAMPLE 3

A continuous alumina-mullite fiber (3M Nextel 720) was coated with a scheelite coating using sol-gel immiscible liquid techniques, as are known in the art. Pentadecane was substituted as the nonpolar solvent layer for hexane. A water based precursor to scheelite was formulated by dissolving 95.15 grams of ethylenediaminetetraacetic acid (EDTA) in water plus ammonium hydroxide. This solution was added to an aqueous solution of 76.89 grams of calcium nitrate. The pH of the EDTA/calcium nitrate solution was adjusted to 10. The total solution volume was approximately 500 ml.

Separately, 92.45 grams of ammonium tungstate (Aldrich catalog no. 32,238-5) was dissolved in boiling water. After the solution cooled to room temperature, the pH was adjusted to 10 and the EDTA/calcium nitrate solution was added. The pH of the mixed solution was kept at greater than 10 to prevent precipitation of scheelite powder. The combined solution had a 3.75% yield of scheelite.

The Nextel 720 fiber was passed through the immiscible liquid coater six times at a rate of 40 in./min. to build up fiber coating thickness. The fiber was then layed up, unidirectionally, into a 3" by 9" die. Alumina powder (Sumitomo AKP-53) was pressure cast at 100 psi within the fiber preform.

The composite was further densified by performing multiple infiltrations with a polymeric alumina precursor solution made according to U.S. Pat. No. 5,437,852. The composite was fired to 1100° C. during the processing steps.

Figure 9:
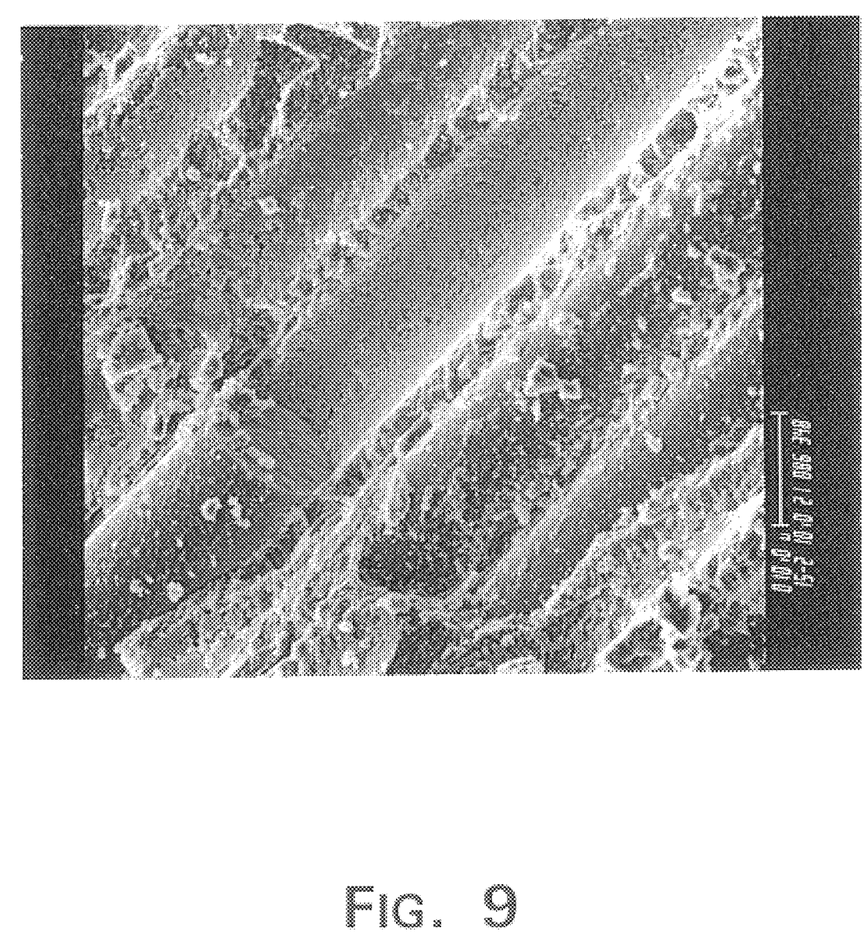
FIG. 9 is an SEM photomicrograph showing the scheelite coated troughs remaining after composite tensile failure of the Example 3 specimens, indicating debonding at the Nextel 720-scheelite interfaces.

The composite exhibited strengths of between 16 ksi and 20 ksi which was weaker than expected based on the volume fraction loading of the continuous Nextel 720 fiber. It was determined that the lower than expected strength was caused by strength degradation of the fibers by the polymeric alumina matrix precursor in regions where there was incomplete coverage of the fibers by the scheelite coatings. However, throughout the composite, substantial debonding was observed at the Nextel 720—scheelite interface. The SEM photomicrograph of FIG. 9 shows the troughs left behind by fractured fibers. The trough is lined with the scheelite coatings.

EXAMPLE 4

A continuous alumina fiber (3M Nextel 610) was coated with an $ErTaO_4$ coating using sol-gel immiscible liquid techniques, as are known in the art. Pentadecane was substituted as the nonpolar solvent layer for hexane. An alcohol based precursor to $ErTaO_4$ was formulated by first dissolving erbium acetate (GFS Chemicals catalog No. A2856) in methanol with heat. The solution was allowed to cool and the $Er_2O_3$ yield of the solution was determined. The yield was typically 1 to 4 weight percent erbium oxide. A correct molar ratio of tantalum ethoxide (Gelest, Inc. Catalog No. AKT810) was added to the erbium acetate/methanol solution. The resulting solution used for depositing the fiber coating was approximately 4 weight percent $ErTaO_4$.

The Nextel 610 fiber was passed through the immiscible liquid coater six times at a rate of 60 in./min. to build up the fiber coating thickness. The fiber was then layed up, unidirectionally, into a 3" by 9" die. Alumina powder (Sumitomo AKP-53) was pressure cast at 100 psi within the fiber preform.

The composite was further densified by performing multiple infiltrations with a somewhat more concentrated $ErTaO_4$ precursor solution. The composite was then segmented into two halves; one half was fired in air at 850° C. and the other half fired in air 1100° C.

Figure 10:
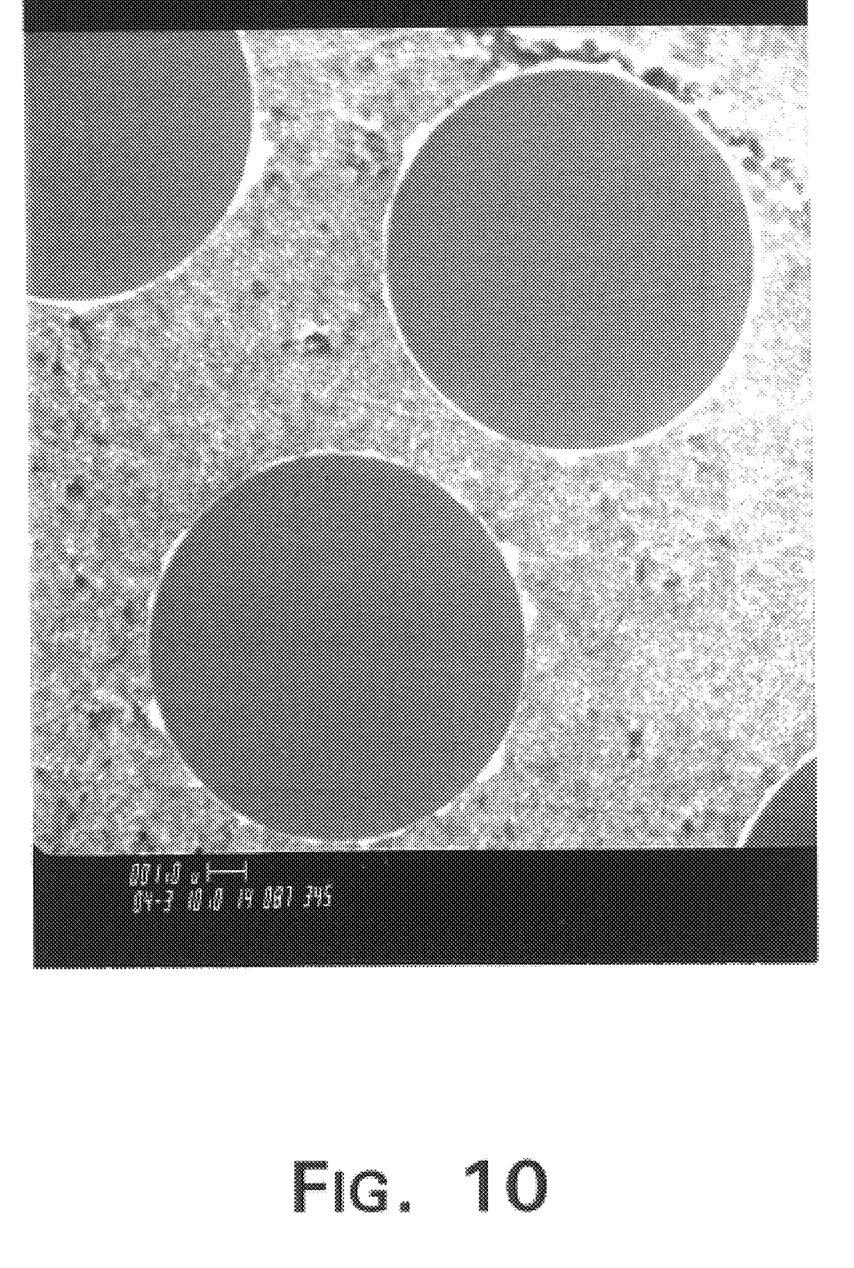
FIG. 10 is an SEM photomicrograph showing $ErTaO_4$ fiber coatings within a continuous fiber reinforced ceramic composite.

FIG. 10 is an SEM photomicrograph of a polished cross section of the unidirectional composite containing $ErTaO_4$ fiber coatings. The coatings were fairly continuous and of a uniform thickness with very little bridging observed between neighboring fibers.

The 850° F. and 1100° C. processed composites was tested in tension at room temperature. Their failure was rather brittle with no substantial fiber-coating interfacial debonding observed. TEM analysis showed that the interface did not undergo any gross reactivity between the $ErTaO_4$ coating and the fibers, indicating stability between the coating and the fibers.

Although interfacial debonding has yet to be shown with a rare earth tantalate, the similarity in crystal structure of the tantalates to monazite ($LaPO_4$) and some of the tungstates and molybdates suggests that they should also be promising interphase materials for ceramic composites. It was observed that the grain size of the $ErTaO_4$ fiber coatings was much smaller than that of the scheelite coatings. It is conjectured that the grain size of the fiber coatings would play a significant role in determining the energy of the interface, and hence the ease at which it can debond. There may likely be a critical grain size for these $ABO_4$ needed to produce debonding at the fiber-coating interfaces.

In a further embodiment, a ceramic composite of the present invention utilizes other oxide reinforcements (either polycrystalline or single crystal) and oxide matrices which are phase compatible with the $ABO_4$ interphase. Some nonoxide particles such as SiC may be present within the matrix and reinforcement as well. SiC fibers, which will inherently contain a thin oxide (silica) surface, may also be incorporated into composites containing $ABO_4$ interphases as long as the specific $ABO_4$ interphase is thermodynamically stable with silica. The $ABO_4$ tungstate, molybdate, tantalate or niobate interphase allows for interfacial debonding and crack deflection around the reinforcement phase and general crack growth inhibition across the interphase/reinforcement and/or interphase/matrix interfacial boundary.

The following tables summarize the similarities between the crystal structures of the $ABO_4$ tungstate, molybdate, tantalate and niobate compounds. They all generally fall within the monoclinic P2/a, monoclinic P2/c, or tetragonal $I4_1/A$ space groups.

TABLE 2

| Compound | Crystal Structure | Space Group | Melting Temperature (C.) |
|---|---|---|---|
| $MgWO_4$ | monoclinic | P2/a | 1358 |
| $CaWO_4$ | tetragonal | $I4_1/A$ | 1580 |
| $SrWO_4$ | tetragonal | $I4_1/A$ | 1535 |
| $BaWO_4$ | tetragonal | $I4_1/A$ | 1475 |
| $MgMoO_4$ | monoclinic (low pressure) | C2/m | 1230 |
|  | monoclinic (high pressure) | P2/c |  |
| $CaMoO_4$ | Not Available | Not Available | 1445 |
| $SrMoO_4$ | tetragonal | $I4_1/A$ | Not Available |
| $BaMoO_4$ | tetragonal | $I4_1/A$ | Not Available |
| $FeWO_4$ | monoclinic | P2/c | Not Available |
| $FeMoO_4$ | monoclinic (high-temperature) | P2/c | Not Available |
|  | monoclinic (low temperature) | C2/m |  |
| $MnWO_4$ | monoclinic | P2/c | ~1372 |
| $MnMoO_4$ | monoclinic | P2/c | ~1130 |
| $ZnWO_4$ | monoclinic | P2/c | ~1167 |
| $ZnMoO_4$ | monoclinic | P2/c | ~1050 |
| $PbWO_4$ | tetragonal | $I4_1/A$ | 1123 |
| $PbMoO_4$ | tetragonal | $I4_1/A$ | 1063 |

TABLE 3

| Compound | Crystal Structure | Space Group | Melting Temperature (C.) |
|---|---|---|---|
| (La, Ce, Pr)$TaO_4$ | undetermined | undetermined | $LaTaO_4$, ~1930 $PrTaO_4$, ~1910 |
| $Me^{3+}TaO_4$ (Me = Y, Nd through Lu) | monoclinic (if crystallized below $T_{tetra-mono}$.) | P2/a | $NdTaO_4$, ~1925 |
|  | monoclinic (after excursion to T > $T_{tetra-mono}$.) | I2 |  |
|  | tetragonal (high temperature) | $I4_1/A$ |  |
| $Me^{3+}NbO_4$ (Me = Y, La through Lu) | monoclinic | I2 (it is not known if a P2/a phase exists) | $LaNbO_4$, ~1620 |
|  | tetragonal (high temperature) | $I4_1/A$ |  |

The use of $ABO_4$ tungstates, molybdates, tantalates, and niobates as interphases in ceramic composites provides weak interfaces with associated reinforcement and/or matrix phases. Composite materials are thereby formed having high toughness and which are able to survive the high temperature oxidizing environments found in a majority of industrial and defense applications. Composite testing results indicate very weak bonding across alumina-scheelite interfaces. The interfacial bonding appears weaker, on a qualitative basis, than what has been observed to date with the prior art alumina-monazite interfaces. Explanations for this interfacial bonding variation between alumina-scheelite and the prior art alumina-monazite are still required.

These interphase materials possess a significant advantage over prior art carbon and boron nitride interfaces in that they are oxidation resistant and will survive the use environments anticipated for ceramic composites. Advantages over the prior art fluorphlogophite and beta-alumina/magnetoplumbite materials include better stability with a wider range of ceramic reinforcements and matrices. In addition, the anisotropic nature of the $ABO_4$ tungstates, molybdates, tantalates, and niobates allow a less restrictive crystal orientation than is required with the layered fluorphlogophite and beta-alumina/magnetoplumbite interphases. The prior art fluorphlogophite and beta-alumina/magnetoplumbite compounds require that the interphase be oriented with the layered crystals' planes parallel to the reinforcement direction in continuous fiber ceramic composites in order for optimum interfacial debonding and fiber slipping to occur. In addition, the beta-alumina and magnetoplumbite compounds typically require quite high processing temperatures to create the layered crystal structures. The temperatures required are often in excess of the maximum temperature at which the reinforcements can be exposed without degrading their strength. As a result, it is difficult to deposit magnetoplumbite coatings such as hibonite onto the current commercially available continuous ceramic fibers without severely degrading the strength of the fibers.

The discovery of nonreactivity and weak bonding along $ABO_4$ tungstate, molybdate, tantalate, and niobate interfaces and possible reinforcement phases increases the selection and engineering of ceramic composite systems with varied chemistries to meet a wider range of corrosive environments. The greater the choices in the chemical composition of the ceramic composites to be put into industrial use, the greater the range of potential applications which can be met by the broad class of materials known as ceramic composites.

While there has been work by others to form a porous oxide interphase region in ceramic composites for creating a weak interface between a reinforcement phase and the ceramic matrix material, these coatings may have a tendency to sinter during use at high temperature thus changing the morphology and performance of the interphase. Dense $ABO_4$ tungstates, molybdates, tantalates, and niobates coatings on the reinforcement phase, in accordance with the invention, can serve not only to control the strength of the reinforcement/matrix interface and the strength and fracture behavior of the resulting composite, but also, by being dense, can protect the reinforcing fibers from chemical attack by any corrosive environment to which the ceramic composite is exposed during use. The reinforcement strength must be preserved to retain composite strength over the lifetime in which the ceramic composite article is to be in service.

While specific embodiments of the invention have been shown and described in detail to illustrate the application of the principles of the invention, it will be understood that the invention may be embodied otherwise without departing from such principles.

I claim:

1. A ceramic composite exhibiting toughness and resistance to high temperature oxidizing environments and having weak interfaces with a ceramic matrix phase, consisting essentially of:

a ceramic matrix selected from the group consisting of: alumina, mullite, rare earth alumina garnet, spinels, silicon carbide, rare earth alumina perovskite, and combinations of any of the foregoing; and a material having the general formula $ABO_4$, wherein A is a divalent cation and B is one of tungsten and molybdenum, dispersed within the ceramic matrix, to create the weak interface between the ceramic matrix and the material, and wherein the material is selected from the group consisting of $SrWO_4$, $BaWO_4$, $SrMoO_4$, $BaMoO_4$, $FeWO_4$, $FeMoO_4$, $MnWO_4$, $MnMoO_4$, $ZnWO_4$, $ZnMoO_4$, $PbWO_4$, and $PbMoO_4$.

2. A ceramic composite according to claim 1, wherein the material dispersed within the ceramic matrix is in the form of one of continuous fibers, discrete particulates, laminae, and whiskers.

3. A ceramic composite according to claim 1, further comprising a reinforcement phase surrounded by the $ABO_4$ material embedded in the ceramic matrix and wherein the composite has weak interfaces with the ceramic matrix and the reinforcement phase.

4. A ceramic composite according to claim 3, wherein the reinforcement phase comprises one of continuous fibers, discrete particulates, laminae, and whiskers.

* * * * *